April 28, 1970     F. W. PAUL, JR., ET AL     3,508,718
SPINDLE FOR CARTRIDGE-LOADING MOTION PICTURE PROJECTORS
Filed May 24, 1968     2 Sheets-Sheet 1

FRANK W. PAUL, JR
PETER ANDREWS
GEORGE NIEDZIELSKI
INVENTORS

BY
ATTORNEYS

April 28, 1970    F. W. PAUL, JR., ET AL    3,508,718
SPINDLE FOR CARTRIDGE-LOADING MOTION PICTURE PROJECTORS
Filed May 24, 1968    2 Sheets-Sheet 2
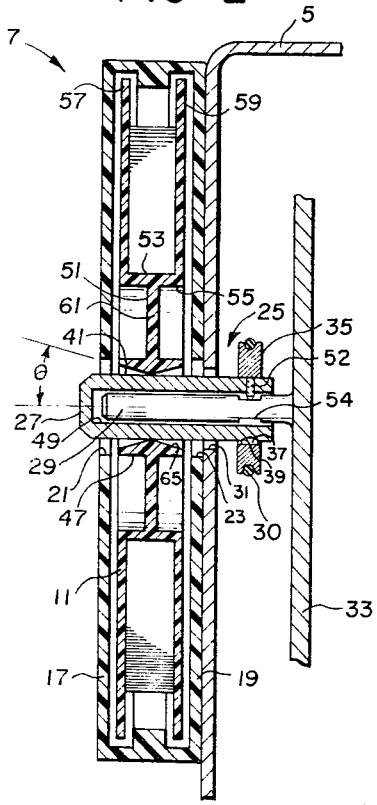
FIG. 2
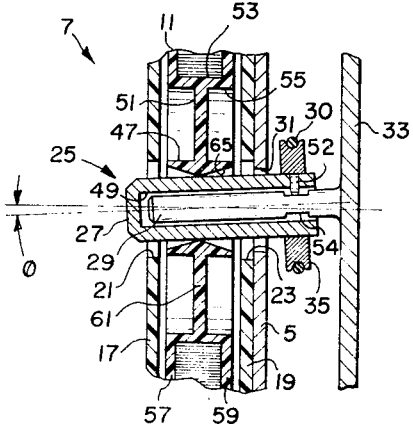
FIG. 3
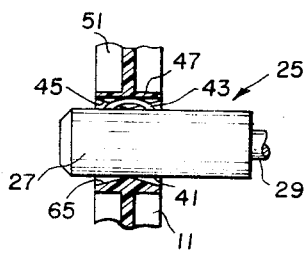
FIG. 4
FIG. 5
FRANK W. PAUL, JR
PETER ANDREWS
GEORGE NIEDZIELSKI
INVENTORS
BY *[signatures]*
ATTORNEYS

United States Patent Office 3,508,718
Patented Apr. 28, 1970

3,508,718
SPINDLE FOR CARTRIDGE-LOADING MOTION PICTURE PROJECTORS
Frank W. Paul, Jr., Macedon, Peter Andrews, Penfield, and George Niedzielski, Rochester, N.Y., assignors to Eastman Kodak Company, Rochester, N.Y., a corporation of New Jersey
Filed May 24, 1968, Ser. No. 731,880
Int. Cl. B65h *17/02*
U.S. Cl. 242—68.3     5 Claims

ABSTRACT OF THE DISCLOSURE

A projector spindle for supporting a reel in a cartridge comprises a hollow sleeve received on an elongated shaft fixed to the projector. The sleeve is mounted for axial movement with respect to the shaft as well as rotary movement with respect thereto, such that the sleeve and a reel supported thereon can move axially in response to engagement between the reel and cartridge to center the reel in the cartridge.

CROSS-REFERENCE TO RELATED APPLICATIONS

Reference is made to the following commonly assigned U.S. patent applications: Ser. No. 679,587, entitled Spindle for Supporting Reels or Spools for Rotation, filed Oct. 16, 1967, in the name of Leslie J. Bunting, now U.S. Patent 3,417,939, issued Dec. 24, 1968; Ser. No. 685,616, entitled Cinematographic Projectors or the Like and Cartridges for use Therewith, filed Nov. 24, 1967, in the name of John J. Bundschuh et al.; Ser. No. 681,295, entitled Automatic Latching Mechanism Film Guide Arm for a Cartridge-Loaded Motion Picture Projector, filed Nov. 7, 1967, in the name of Leslie J. Bunting, now U.S. Patent 3,394,901, issued July 30, 1968, and Ser. No. 731,561, entitled Cartridge, filed May 23, 1968 in the name of John J. Bundschuh.

BACKGROUND OF THE INVENTION

The present invention relates to spindles for motion picture projectors. More specifically, the invention relates to spindles suitable for supporting reels having a capacity for 200' or more of film on a projector or the like.

While useful with different types of projectors, the present invention has particular utility on cartridge-loading motion picture projectors adapted to receive and support a cartridge containing a reel of processed motion picture film.

It is well known to provide a projector with a spindle comprising a rotatable sleeve mounted on a fixed shaft secured to a vertical wall of the projector. It is further known to rotatably support a supply reel on such a spindle sleeve and to rotatably drive the reel and spindle sleeve during operative cycles of the projector. Such a spindle and reel are described and illustrated, for example, in the before-mentioned U.S. Patent 3,417,939. In said Bunting patent the rotatable sleeve includes means for axially locating the reel with respect to the projector wall, which means comprises a shoulder at one end of the sleeve adjacent the projector and one or more detent members at the other end of the spindle remote from the projector. The reel mounting sleeve is prevented from moving axially with respect to the shaft by a wire clip or other suitable means and, therefore, the shoulder and detent on the spindle sleeve serve to locate the reel with respect to the purojector as well as with respect to the sleeve.

While such prior art spindles have proven satisfactory for their intended purpose on the unenclosed-reel type of projector, certain modifications have been found necessary to adapt such spindles to the cartridge-loading type of projector wherein the cartridge is latched and located against a wall of the projector independently of the spindle, and the reel, which is mounted on the spindle, must be located with respect to the cartridge as well as the projector. In order to adapt such prior spindles to the special problems of cartridge-loading projectors, it was first attempted to simply eliminate the means which located the reel (e.g., the shoulder and detent means) of previously known reels. With this modification, the reel would be free to move axially with respect to the spindle sleeve and could thereby properly locate itself within the cartridge. Thus, the cartridge would take over the function of the locating means previously on the spindle, and, at the same time, the reel would assume the best running position within the cartridge where the frictional resistance between the reel flanges and cartridge walls would be at a minimum.

The above modifications of previously known spindles would appear to be satisfactory, and, in fact, have proven to be at least adequate on projectors adapted to receive the smaller cartridges, such as those which contain 50 or 100-foot reels.

However, on projectors adapted to receive larger cartridges, such as those which contain 200 or 400-foot reels, certain detrimental effects which are exaggerated or compounded by the increased size and weight of the reel, make previously known spindles and reels somewhat unsatisfactory even though modified as discussed above. For example, it has been found unexpectedly that the increase in weight, due to the increase in the size of the reel and the amount of film on the reel, increases the frictional resistance to movement of the reel on the spindle sleeve to the extent that the reel will not properly locate itself within the cartridge. Moreover, for numerous reasons, the spindle and/or the spindle sleeve may be tilted with respect to the projector and cartridge walls to the extent that the reel flanges will frictionally engage or even bind between opposite walls of the cartridge. This last mentioned effect is particularly apparent with weight-sensitive spindles of the type described in commonly assigned U.S. Patent No. 3,310,251, issued Mar. 21, 1967, wherein the proper operation of the spindle may result in a tilting of the spindle from the horizontal.

SUMMARY OF THE INVENTION

An object of the present invention is to provide means for mounting a reel on a projector adapted to operate satisfactorily with cartridges containing reels having a capacity for 200' or more of film.

In a disclosed embodiment of the invention, a reel supporting portion of a projector spindle is mounted for axial as well as rotary movement with respect to the projector surfaces. In this manner, the reel can move axially with such spindle portion in response to frictional forces between the reel and cartridge to thereby center the reel within the cartridge.

BRIEF DESCRIPTION OF THE DRAWINGS

FIG. 2 is a cross-sectional view of the cartridge and a portion of the projector of FIG. 1 showing a spindle in accordance with the present invention supporting a reel within the cartridge.

FIG. 3 is a fragmentary cross-sectional view similar to FIG. 2 but showing the reel receiving portion of the spindle at an angle with respect to the cartridge walls and the manner in which the reel corrects for such angle.

FIG. 4 is a fragmentary cross-sectional view of the spindle and reel of FIG. 2 showing the manner in which the reel is rotatably supported and driven by said spindle.

FIG. 5 is a fragmentary cross-sectional view similar to FIG. 2 but showing the reel axially displaced within the cartridge and the manner in which the spindle is adapted to correct for such displacement.

DESCRIPTION OF THE PREFERRED EMBODIMENTS

Figure 1:
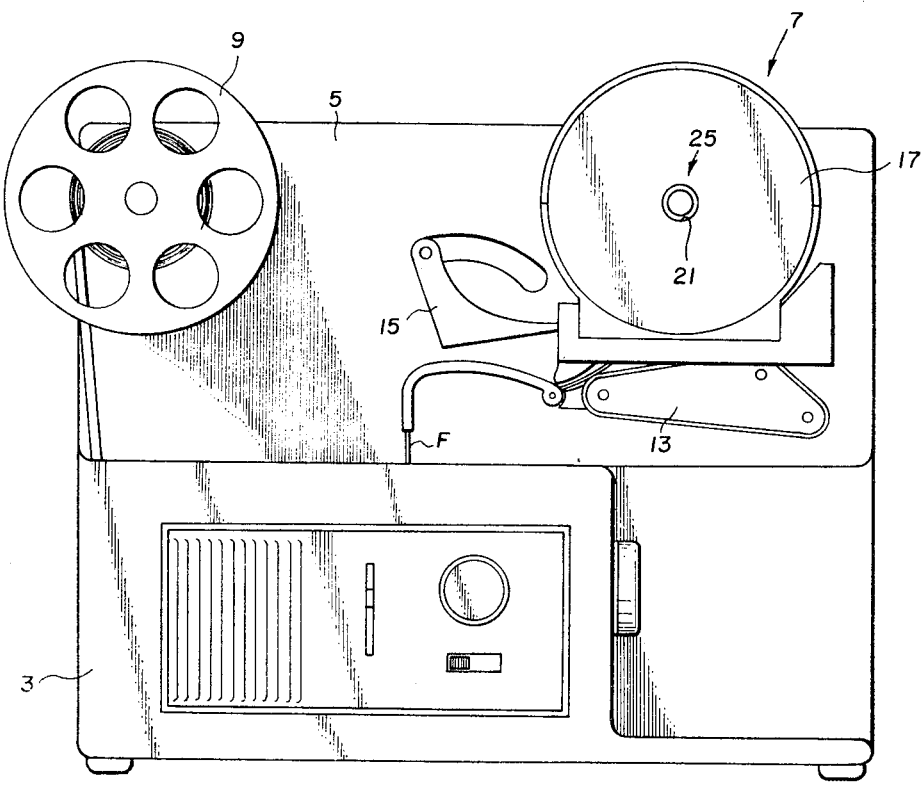
FIG. 1 is a front elevational view of a cartridge-loading motion picture projector illustrating the manner in which a cartridge may be positioned on the projector.

Referring now to the drawings and particularly to FIG. 1, a cartridge-loading motion picture projector is shown which may be of any suitable type such as the projector described and illustrated in commonly assigned copending U.S. application Ser. No. 685,616, entitled Cinematographic Projectors or the Like and Cartridges for use Therewith, filed Nov. 24, 1967, in the name of John J. Bundschuh et al. Briefly, the projector comprises a casing 3 defining a front wall 5 adapted to support a supply cartridge 7 and a film take-up means such as reel 9. Cartridge 7 is adapted to contain a reel 11 of motion picture film and may be oriented and retained on the projector by cooperating surface formations on the cartridge and projector (not shown) and by latching surfaces on the cartridge and latching levers on the projector (not shown). Suitable orienting and retaining means of this general type are disclosed, for example, in commonly assigned copending U.S. Patent 3,394,901, entitled Automatic Latching Mechanism and a Film Guide Arm for a Cartridge-Loading Motion Picture Projector, issued July 30, 1968, in the name of Leslie J. Bunting.

Movably secured to the front of the projector in accordance with the disclosure of the aforementioned U.S. application Ser. No. 685,616 are means 13 and 15 for engaging and removing film F from the cartridge and for directing the film to a threading mechanism of the projector which automatically feeds the film along a path to the take-up reel 9 in a manner well known to those skilled in the art. After projection in the usual manner, the film is rewound back into the cartridge by an automatic rewind means such as the mechanism disclosed in commonly assigned Patent No. 3,300,155, entitled Automatic Rewinding Mechanism for Film or the Like, issued Jan. 24, 1967, in the name of R. J. Roman.

The cartridge 7 to be latched to the projector may be of any suitable type, such as the two part casing adapted to contain a reel of 400-foot capacity such as described and illustrated in commonly assigned copending U.S. patent application Ser. No. 731,561, entitled Cartridge, filed May 23, 1968, in the name of John J. Bundschuh. Generally, the cartridge defines side-walls 17 and 19 having central openings 21 and 23, respectively, through which the projector spindle 25 may extend. Previously mentioned latching and orienting surfaces (not shown) on the cartridge and projector are adapted to retain the cartridge in an accurately located position flush against and parallel to vertical wall 5 of the projector.

Referring now more particularly to features of the present invention and to FIGS. 2-5, a spindle 25 is disclosed comprising a rotatable portion such as elongated cylinder or sleeve 27 and an elongated member in the form of shaft 29. Shaft 29 passes through an opening 31 in the projector front wall 5 and is fixed to a spindle supporting means such as inner wall 33 of the projector. While disclosed in its simplest form, spindle 25 may take any of several other forms without departing from the present invention, such as the form of the weight sensitive spindle disclosed in the aforementioned U.S. Patent No. 3,310,251.

At one end of the spindle 25 and preferably behind the projector front wall 5, the sleeve 27 is provided with means for rotatably driving the spindle, taking the form in the disclosed embodiment of a pulley 35 which is non-rotatably keyed to the sleeve 27 by a key 37 on pulley 35 received in a slot 39 on sleeve 27. Pulley 35 and sleeve 27 are rotatably driven by a motor (not shown) of the projector, which is operably connected to the pulley by belt 30.

At the other end of the spindle remote from the projector the sleeve 27 defines an external surface 41 (FIG. 4) adapted to support a reel 11 of processed motion picture film. The reel rotates with the spindle and is rotatably driven thereby through driving member or detent 43 (FIG. 4) which fits within a cooperating recess 45 in the core 47 of the reel.

Sleeve 27 also defines interior surfaces such as annular opening or bore 49 having an internal diameter slightly larger than the external diameter of shaft 29. Thus the sleeve can be received on the shaft in the usual manner for rotation with respect to the shaft and projector. However, in accordance with the present invention, the sleeve is mounted not only for such rotar ymovement, but also is mounted not only for such rotary movement, but also and projector. Such axial movement is provided for in the disclosed embodiment by a pin 52 on sleeve 27 which cooperates with a circular recess 54 on shaft 29. Pin 52 can move axially in recess 54 to permit limited axial movement of the sleeve 27. However, at the same time, the pin prevents excessive axial movement or disengagement of the sleeve from the shaft.

Referring now to the function of such axial movement, as previously mentioned it is desirable for satisfactory operation of a cartridge-loading motion picture projector that the supply reel be centered between the cartridge walls to reduce the frictional contact between the reel and the reel and the cartridge. However, it has been found with reels of 200' or larged capacity that, due to the frictional resistance to movement between the reel core and the outer surface of the spindle, the reel will not center itself adequately in the cartridge. This resistance to axial movement is due to in part to the weight of the reel and film thereon and in part to the relatively high coefficient of friction between the plastic surfaces of the reel and the spindle which are not lubricated.

In accordance with the present invention, instead of relying entirely on axial movement between the reel core and outer spindle surface, a portion of the spindle itself is adapted to move axially to center the reel in the cartridge. Since the movable portion of the spindle is lubricated, the coefficient of friction between the relatively movably surfaces of the spindle is much lower than the coefficient of friction between the reel core and the outer spindle surface. Moreover, as disclosed, the axially movable portion of the spindle is preferably the same as the rotatable portion thereof, and such portion will always be in motion during operation of the projector. Therefore only the dynamic coefficient of friction need be overcome to shift the spindle sleeve and reel axially rather than the greater static cofficient of friction which must be overcome with previously known spindles.

The amount of axial movement desirable for satisfactory opeartion depends on the dimensions and clearances of and between the particular reel and cartridge. Preferable, the reel supporting portion of the spindle should be capable of sufficient axial shifting for the reel to move freely between the sides of the cartridge. In the embodiment disclosed the permissible axial shifting is at least .01 inch and is preferably .1 of an inch.

Reel 11 adapted to be contained in cartridge 7 comprises a hub 51 having an annular outer surface 53 on which film is adapted to be wound and an inner surface 55. A pair of spaced side flanges 57 and 59 extend radially outwardly from hub 51 to guide successive convolutions of film onto the hub when the reel is first loaded with film or during a rewind cycle of the projector. A web 61 extends radially inwardly from the hub and supports a core 47 coaxially therewith for mounting the reel on the projector spindle 25.

Core 47 of reel 11 comprises a central opening or bore 65 having an internal diameter at the axial center which is less than the diameter at the ends of the bore. In the embodiment disclosed, the bore defines two opposed frustro-conical openings tapered toward the axial center of the reel to a diameter which is slightly larger than the outer diameter of the projector spindle. While the degree of taper may be any suitable amount for the intended purpose to be described more fully hereinafter, a taper within the range of 2°–7° and preferably about 5° has been found satisfactory.

Referring now to FIG. 3, the reel supporting surfaces of the spindle have been shown at an angle to the horizontal and out of alignment with the perpendicular to the projector wall. Such misalignment can occur for any number of reasons, such as poor manufacturing tolerances or wear between the rotatable and fixed portions of the spindle. Thus, the misalignment may be between the shaft 29 and the projector wall 5 or between the sleeve 27 and the shaft 29. Moreover, in weight sensitive spindles of the previously mentioned type disclosed in U.S. Patent No. 3,310,251, a certain amount of off-axis bending is expected during normal operation of the spindle.

In projectors which operate only with unemployed unenclosed reels, and even in projectors adapted to operate with certain smaller size cartridges, this misalignment of the spindle is not intolerable. However, in projectors adapted to operate with the larger cartridge sizes, such as 200 or 400-foot cartridges, any misalignment of the spindel is exaggerated due to the large diameter of the reel in such cartridges. Since the reel is closely confined within the cartridge, even a small amonut of misalignment of the spindle will cause previously known reels to frictionally engage the side-walls of these larger cartridges.

However, when the reel core is provided with a tapered or arcuate bore, the reel can wobble on the spindle or assume an angular position on the spindle as shown in FIG. 3, to thereby properly align itself within the cartridge in response to fritcional and other forces, between the cartridge and reel, regardless of the angular orientation or misalignment of the spindle.

The invention has been described in detail with particular reference to preferred embodiments thereof, but it will be understood that variations and modifications can be effiected within the spirit and scope of the invention as described hereinabove and as defined in the appended claims.

We claim:
1. In a spindle for a motion picture projector wherein the spindle is adapted to support a reel positioned within a cartridge or the like and between spaced walls of the cartridge, the improvement comprising:
   an elongate shaft mounted on the projector,
   a sleeve slidably mounted on said shaft for axial and rotational movement with respect to said shaft,
   means for coupling said sleeve to said shaft and for limiting axial movement of the sleeve with respect to said shaft,
   means coupled to said sleeve for rotating said sleeve on said shaft, and
   means on said sleeve for securing said sleeve to a reel within a cartridge for conjoint rotation of the sleeve and reel and for conjoint axial movement of the sleeve and reel with respect to said shaft.

2. In a spindle as set forth in claim 1 wherein the means for coupling said sleeve to said shaft comprises a pin on one of the members partially received in a circular recess in the other of the members, the recess having a width relative to the size of the pin which permits axial movement of the sleeve on the shaft of at least .01".

3. In a spindle as set forth in claim 1 wherein the means for coupling said sleeve to said shaft comprises a pin on one of the members partially received in a circular recess in the other of the members, the recess having a width relative to the size of the pin which limits axial movement of the sleeve on the shaft to approximately .05".

4. A spindle adapted to support a reel on a motion picture projector, the spindle comprising:
   a shaft adapted to be mounted on a projector,
   a sleeve for supporting the reel, the sleeve being slidably mounted on said shaft for axial and rotational movement with respect to said shaft, and
   means for coupling said sleeve to said shaft and for defining limits of the axial movement of the sleeve with respect to said shaft.

5. A spindle as set forth in claim 4 further comprising means coupled to said sleeve for rotating said sleeve on said shaft, and means on said sleeve for keying said sleeve to a reel for conjoint rotation of the sleeve and reel and for conjoint axial movement of the sleeve and reel with respect to said shaft.

References Cited

UNITED STATES PATENTS 1,378,672   4/1969   Foothorap _____ 242—68.3

NATHAN L. MINTZ, Primary Examiner